United States Patent
Foo

(10) Patent No.: US 12,235,670 B2
(45) Date of Patent: *Feb. 25, 2025

(54) CLOCK DISCIPLINING AND SYNCHRONIZING

(71) Applicant: FMAD Engineering (SNG) Pte. Ltd., Singapore (SG)

(72) Inventor: Aaron Foo, Singapore (SG)

(73) Assignee: FMAD Engineering (SNG) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,593

(22) Filed: Feb. 12, 2024

(65) Prior Publication Data

US 2024/0219954 A1   Jul. 4, 2024

Related U.S. Application Data

(63) Continuation of application No. 17/681,194, filed on Feb. 25, 2022, now Pat. No. 11,940,835.

(51) Int. Cl.
  *G06F 1/08* (2006.01)
  *G06F 1/14* (2006.01)

(52) U.S. Cl.
  CPC . *G06F 1/08* (2013.01); *G06F 1/14* (2013.01)

(58) Field of Classification Search
  CPC ................. G06F 1/32; G06F 1/12; G06F 9/44
  See application file for complete search history.

(56) References Cited

U.S. PATENT DOCUMENTS

| | | | |
|---|---|---|---|
| 5,287,359 A * | 2/1994 | Engelse | H04L 25/068 375/333 |
| 8,583,957 B2 | 11/2013 | Chandhoke | |
| 8,971,356 B2 | 3/2015 | Geva | |
| 9,176,217 B2 | 11/2015 | Krasner | |
| 9,229,433 B1 | 1/2016 | Hiebert | |
| 9,312,977 B1 | 4/2016 | Khuu | |
| 9,519,306 B2 | 12/2016 | Kishiro | |

(Continued)

OTHER PUBLICATIONS

"Measuring clock speed," Gisselquist Technology, LLC, https://zipcpu.com/blog/2020/07/04/clkcounter.html, Jul. 4, 2020.

(Continued)

*Primary Examiner* — Keshab R Pandey
(74) *Attorney, Agent, or Firm* — McDonnell Boehnen Hulbert & Berghoff LLP

(57) ABSTRACT

An embodiment may involve receiving a signal indicative of an edge of a reference clock, wherein the reference clock has a fixed clock period, wherein a hardware clock signal generator ticks at a variable clock period, and wherein a local time value is increased by a local time increment on ticks of the hardware clock signal generator; reading the local time value and writing it to a memory as a current time value; determining a difference between the current time value and a previous time value that was written to the memory in response to receiving a previous signal from the reference clock; based on the difference, determining an adjustment to the local time increment so that the local time value increases at a rate that is closer to that of the reference clock; and modifying the local time increment by the adjustment.

20 Claims, 11 Drawing Sheets

(56) References Cited

U.S. PATENT DOCUMENTS

| | | |
|---|---|---|
| 9,955,443 B2 | 4/2018 | Charles |
| 10,084,559 B1* | 9/2018 | Devineni ............ H04J 3/0661 |
| 10,553,264 B2 | 2/2020 | Kim |
| 10,749,535 B2 | 8/2020 | Nelson |
| 2004/0205372 A1* | 10/2004 | Moser ................ G06F 11/2097 |
| | | 714/1 |
| 2012/0099687 A1 | 4/2012 | Verhaegen |
| 2014/0211816 A1 | 7/2014 | Ekner |

OTHER PUBLICATIONS

"Precision Time Protocol," Wikipedia, https://en.wikipedia.org/wiki/Precision_Time_Protocol, printed from the World Wide Web, Nov. 3, 2021.

E. Mallada, et. al., "Skewless Network Clock Synchronization Without Discontinuity: Convergence and Performance," ttrXiv:1405.6477v2 [math.QC] Jul. 28, 2014.

M. Stankovic, et. al., "Distributed Time Synchronization for Networks with Random Delays and Measurement Noise," 1:trXiv:1705.10408v2 [cs.SY] Feb. 2, 2018.

* cited by examiner

CLOCK DISCIPLINING AND SYNCHRONIZING

CROSS-REFERENCE TO RELATED APPLICATION

This application is a continuation of and claims priority to U.S. patent application Ser. No. 17/681,194, filed Feb. 25, 2022, which is hereby incorporated by reference in its entirety.

BACKGROUND

Maintaining high-resolution synchronized clocks across units of electronics and computing hardware has presented itself as a challenge in multiple fields, including but not limited to fifth generation (5G) wireless networks, broadcast television networks, network security, and network packet capture applications. Existing techniques can be used to synchronize the time of a local clock (e.g., one that is on or used by a processor or integrated circuit and is updated based on a hardware clock signal generator) to coordinated universal time (UTC) with millisecond accuracy. The UTC readings are provided by a reference clock that is assumed to provide ground truth time.

However, hardware clock signal generators with very high frequencies (e.g., a few nanoseconds between ticks) can rapidly drift out of synchronization with a reference clock. Further, the magnitude of this drift can vary based on environmental factors, such as device material properties, temperature, and power source stability. As a consequence, different local clocks within the same computing device or within different computing devices in the same or a different data center can exhibit drifts from a UTC reference clock and each other that are significant enough over time to be notable in the timestamps they create in messages and log files. Such clock inconsistencies can cause protocols to fail and/or logged timestamps to be inaccurate.

SUMMARY

The embodiments herein overcome these and possibly other limitations of the current technology by introducing a computationally efficient and yet highly-effective clock disciplining and synchronization technique that can be carried out independently on units of hardware or computing devices. This technique can synchronize the time derived from a local clock to within approximately 10 nanoseconds of that of a reference clock, which is the practical hardware limit of such synchronization for realistic clock frequencies.

The local clock is assumed to be updated based on ticks from a hardware clock signal generator. It is also assumed that the hardware clock signal generator is designed to operate in accordance with an ideal, specified clock period. This specified clock period may be a small number of nanoseconds, for example. The local clock maintains a local time value that is incremented on ticks of the hardware clock signal generator and is stored in one or more registers or variables. This local time value represents current time as the amount of time that has passed since a predetermined epoch (e.g., the number of seconds and fractional seconds since this epoch, or the number of nanoseconds and fractional nanoseconds since this epoch). In response to each tick of the hardware clock signal generator, the local time value is increased by a local time increment. Initially, this local time increment may be set to the specified clock period of the hardware clock signal generator, but could start at other values.

If a hardware clock signal generator were capable of perfect operation—with exactly one specified clock period of time passing between each tick—this arrangement would result in clocks remaining synchronized so long as the local time increment equals the specified clock period. But, as noted, the actual clock period of the hardware clock signal generator can vary and thus drift from this specified clock period. While the amount of drift per tick of the hardware clock signal generator may be small, the accumulated drift over the course of a larger time frame (e.g., one second) may be enough to render ticks received from the hardware clock signal generator (and thus the time of the local clock) to be inaccurate. This happens even when network time synchronization protocols are used to correct the local time value.

To overcome these limitations, a reference clock signal is introduced. The reference clock may provide high-accuracy, periodic ticks in the form of pulses or data transmitted to the computing device hosting the local clock. The reference clock may be of, or derived from, a global positioning system (GPS) clock signal or atomic clock signal, for example. The reference clock may tick at a much lower frequency than that of the hardware clock signal generator—for example, the reference clock may provide pulse-per-second (PPS) signals with the rising edges of such signals aligned to that of UTC seconds. Regardless, for purposes of these embodiments, the reference clock is assumed to be ground truth accurate and thus have a fixed clock period.

To detect and accommodate for the inaccuracies of the hardware clock signal generator, the local time value may be sampled on reception of signals from the reference clock. These samples are stored in memory, with at least a current sample and the previous sample being available (i.e., the previous sample may be the sample taken on the reception of the most recent previously-received reference clock signal). When the difference between these two samples (i.e., the current sample minus the previous sample) is more or less than exactly the fixed clock period of the reference clock, this indicates that the local time value has been incrementing at a rate that is different from the rate at which the reference clock increments. In response, the local time increment can be increased or decreased to bring these rates closer to one another.

Thus, the varying clock period of the hardware clock signal generator can be corrected continuously during operation with a few computationally-efficient operations. In practice, this results in timestamps derived from the local clock being synchronized within 10 nanoseconds of timestamps derived from the reference clock and/or within 10 nanoseconds of timestamps recorded by other devices synchronized to the reference clock in this fashion. For some hardware, this synchronization can be with 1 nanosecond.

Accordingly, a first example embodiment may involve receiving a signal indicative of an edge of a reference clock, wherein the reference clock has a fixed clock period, wherein a hardware clock signal generator ticks at a variable clock period, and wherein a local time value is increased by a local time increment on ticks of the hardware clock signal generator. The first example embodiment may also involve, possibly in response to receiving the signal, reading the local time value and writing it to a memory as a current time value. The first example embodiment may also involve determining a difference between the current time value and a previous time value that was written to the memory in response to receiving a previous signal from the reference clock, wherein the previous time value is based on a previous reading of the local time value. The first example embodiment may also involve, possibly based on the difference, determining an adjustment to the local time increment so that the local time value increases at a rate that is closer to that of the reference clock. The first example embodiment may also involve modifying the local time increment by the adjustment.

A second example embodiment may involve an interface configured to receive signals from a reference clock, wherein the reference clock has a fixed clock period. The second example embodiment may also involve a hardware clock signal generator that ticks at a variable clock period. The second example embodiment may also involve memory configured to store a local time value, wherein the local time value is increased by a local time increment on ticks of the hardware clock signal generator. The second example embodiment may also involve an integrated circuit containing a state machine configured to: (i) detect a signal from the reference clock, and (ii) in response to detecting the signal, read the local time value and store it as a current time value. The second example embodiment may also involve one or more processors configured to execute program instructions that cause the computing device to: determine a difference between the current time value and a previous time value that was stored in response to receiving a previous signal from the reference clock, wherein the previous time value is based on a previous reading of the local time value; possibly based on the difference, determine an adjustment to the local time increment so that the local time value increases at a rate that is closer to that of the reference clock; and modify the local time increment by the adjustment.

The embodiments may further involve reading, from the memory, a latest timestamp that is based on the local time value and a time offset; determining a new time offset that would phase-synchronize the latest timestamp with the signal on a boundary defined by the fixed clock period; setting the time offset to the new time offset; and applying the time offset to the latest timestamp.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
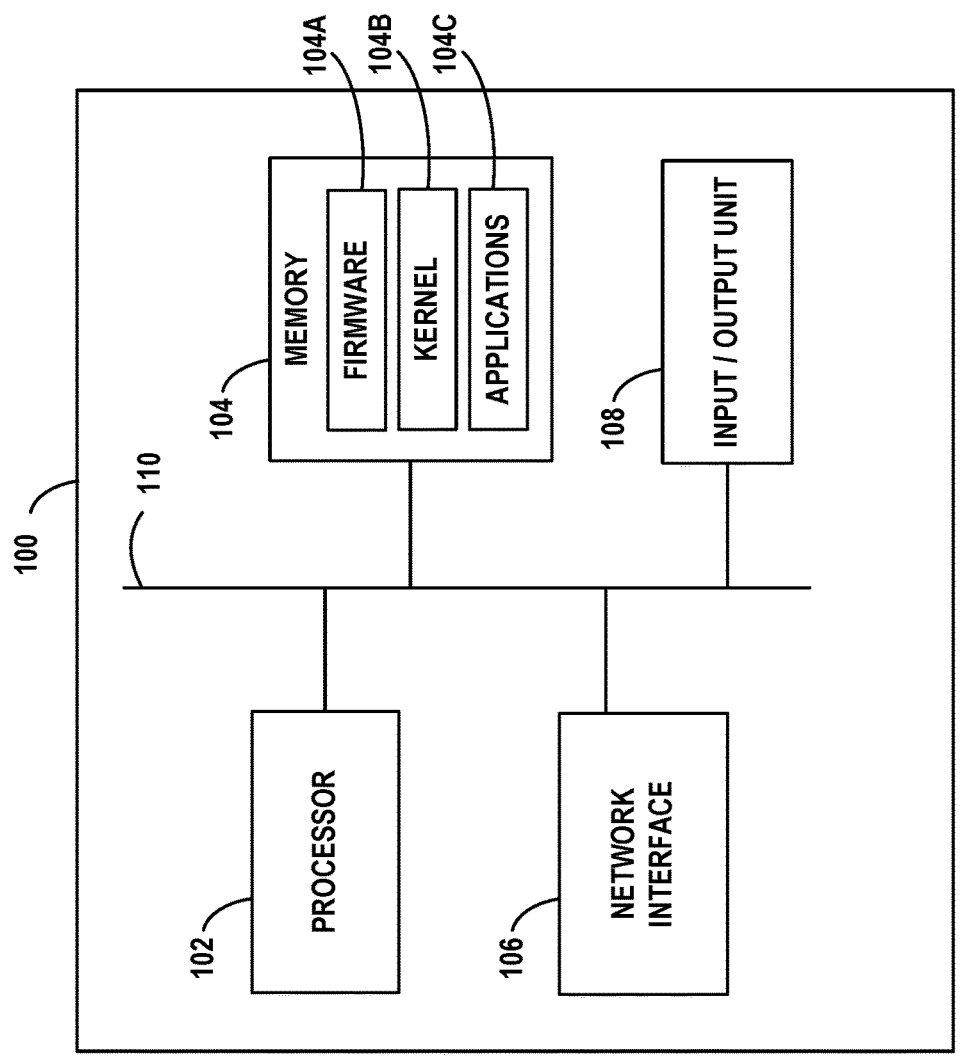
FIG. 1 is a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

The terminology used herein shall be defined as follows unless context suggests otherwise.

A "reference clock" is a clock to which one or more other clocks are to be synchronized. These other clocks may be disposed within devices and systems that are communicatively coupled to the reference clock by a network, for example. Such a reference clock may provide timestamps and/or periodic pulses in accordance with a reference clock period. The reference clock period may be on the order of one second, though other possibilities exist. The timing of a reference clock is presumed to be accurate, with a fixed reference clock period, and perhaps synchronized with UTC.

A "local clock" is a clock for which synchronization with a reference clock is sought. Computing devices, such as server devices in data centers, may have one or more local clocks and each may be synchronized to some extent with one or more reference clocks. Note that this synchronization may not be perfect. Further, while local clocks are designed to have a fixed clock period (e.g., the time between ticks of a local clock may be based on a hardware clock signal generator such as a phase lock loop oscillator), in practice these periods can vary slightly due to manufacturing flaws and operational environment. Typically, local clocks tick once every few nanoseconds, and thus at a rate that is much higher than that of a reference clock.

A "timestamp" is a representation of a point in time, and can be expressed in units of seconds or nanoseconds with or without a fractional component, using 32, 64, or 96 bits for example.

I. Example Computing Device

FIG. 1 is a simplified block diagram exemplifying a computing device 100, illustrating some of the components that could be included in such a computing device. Computing device 100 could be a client device (e.g., a device actively operated by a user), a server device (e.g., a device that provides computational services to client devices), or some other type of computational platform.

In this example, computing device 100 includes processor 102, memory 104, network interface 106, and an input/output unit 108, all of which may be coupled by system bus 110 or a similar mechanism. In some embodiments, computing device 100 may include other components and/or peripheral devices (e.g., detachable storage, printers, and so on).

Processor 102 may represent one or more of any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives (HDDs), solid state drives (SSDs), compact discs (CDs), digital video discs (DVDs), and/or tape storage). Other types of memory may be used. In some embodiments, memory 104 may include remote memory, such as Internet Small Computer Systems Interface (iSCSI).

Memory 104 may store program instructions and/or data on which program instructions may operate. As shown in FIG. 1, memory may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses), of computing device 100. Applications 104C may be one or more user-space software programs, such as web browsers or email clients, as well as any software libraries used by these programs. Each of firmware 104A, kernel 104B, and applications 104C may store associated data (not shown) in memory 104.

Network interface 106 may include one or more wireline interfaces, such as Ethernet (e.g., 100 megabit per second Ethernet, gigabit Ethernet, 10 gigabit Ethernet, and so on). Network interface 106 may also support communication over non-Ethernet media, such as coaxial cables or power lines, or over wide-area media, such as Synchronous Optical Networking (SONET) or digital subscriber line (DSL) technologies. Network interface 106 may further include one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. As an example, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In FIG. 1, a hardware clock signal generator may be attached to or incorporated within processor 102 and/or network interface 106, for example. Such generator may be an integrated circuit with a crystal oscillator designed to produce electrical signals at a particular frequency (though, as noted above, generation of the signals may drift from this frequency). Thus, the hardware clock signal generator ticks with a clock period that is the inverse of this frequency. Some hardware clock signal generators are powered by batteries so that they continue operating even when computing device 100 is powered off.

In general, local clock operation involves maintaining a local time value that represents the amount of time (e.g., in seconds plus fractional seconds or in nanoseconds with or without fractional nanoseconds) that has passed since a predetermined epoch (e.g., midnight Jan. 1, 1970). Once per tick of the hardware clock signal generator, this local time value is updated by a time increment, where the time increment is the specified clock period of the hardware clock. For instance, a hardware clock signal generator with a 156.25 megahertz frequency will have a period of 6.4 nanoseconds.

For sake of simplicity, these components and stored values may all be referred to as part of a "local clock", and some of the updating operations may occur in software or firmware.

II. Time Management in Computer Networks and Computing Hardware

Clock synchronization is a critical feature in a number of modern computing environments. Here, "clock synchronization" refers the act of setting the time generated by way of a local clock to be aligned with that of a reference clock. For most purposes, the time of the reference clock is assumed to be the "real" or ground truth time. The terms "drift" and "clock drift" refers to any phenomenon that causes the time derived from a local clock to lose synchronization with the reference clock.

Clock synchronization typically occurs through use of a synchronization protocol, such as the Network Time Protocol (NTP) or Precision Time Protocol (PTP). In short, NTP and PTP require that a system hosting the local clock has a means of communicating with the reference clock (e.g., a dedicated channel or a network connection). Both NTP and PTP rely on the existence of a hierarchy of time servers, each level referred to as a stratum and serving as a reference clock to time servers in the next level stratum.

For example, an NTP stratum 0 time server typically uses a high-precision time source, such as an atomic clock, GPS clock, or another form of radio clock. Stratum 0 time servers are reference clocks to stratum 1 time servers, stratum 1 time servers are reference clocks to stratum 2 time servers, and so on. The closer to stratum 0 in the hierarchy, the more accurate the expected synchronization to the respective reference clocks. For instance, stratum 1 clocks may synchronize to physically attached stratum 0 clocks, while stratum 2 clocks may synchronize to one or more stratum 1 clocks over a computer network (e.g., by way the Internet to a public NTP server or to a dedicated GPS clock).

An NTP client may be a computing device that polls one or more time servers of a lower-numbered stratum to determine its time offset and roundtrip delay with the reference clocks of each time server. The computing device records timestamps of when a request was sent and the corresponding response was received. The time servers record timestamps of when the requests were received and when the corresponding responses were transmitted.

These timestamps are placed in NTP packets so that the NTP client can perform a few simple mathematical calculations to determine a reasonably accurate estimate of the time offset and roundtrip delay for each reference clock. A series of such measurements may be made to each time server and each of the resulting time series can be processed to improve the estimates (e.g., outliers may be discarded and a low-pass filter may be applied to damp the impact of variability).

Once the time offset and roundtrip delay are established, the local clock of the computing device hosting the NTP server may be adjusted to the time of the reference clock. Doing so slowly, rather than making one larger adjustment, can avoid situations where the local clock appears to make large jumps backward or forward in time. Once the clocks are synchronized in this fashion, NTP is run periodically to resynchronize the clocks. Commonly, this resynchronization occurs at a polling interval of every 64-1024 seconds.

Note that the NTP client may be operating on any type of computing device, including server devices and user-facing client devices, as well as time servers. For instance, an NTP client operating on a stratum k time server can be used to synchronize this time server with one or more stratum k−1 time servers.

PTP operates in a similar fashion as NTP, but is designed for scenarios where the local clock and the reference clock are on the same local area network (LAN). Typical PTP implementations are in hardware, resulting in a clock synchronization accuracy in the microsecond range. These implementations use similar calculations as NTP to determine offset and roundtrip delay, though network layer multicast or broadcast is used to distribute the reference clock.

As noted previously, accurate clock synchronization is important in multiple technological fields. For example, 5G wireless networks employ time-division duplex (TDD) technologies, in which uplink and downlink channels share the same wireless frequencies but are used for transmission at different times. If radio nodes and mobile devices are not properly synchronized, interference and other errors could occur, limiting data rates or preventing communication altogether.

In security network protocols, a lack of appropriate clock synchronization may cause transactions to fail, and/or packets from these transactions may appear to arrive at a destination before they were transmitted by a source. Also, many protocols define a window of time outside of which packets from transactions will be considered invalid. Improperly synchronized clocks can cause failure of such basic checks.

In packet data capture applications, accurate timestamps are necessary to verify the ordering of packet transmission and reception times (and other events) across multiple devices. These applications may be used to verify transactions or to debug problems in a network. Without accurate timestamps, such operations are significantly more difficult if possible at all. In general, any distributed logging procedures can suffer from the same problems.

These issues have grown in magnitude and complexity as clock speeds have increased in recent years. Today, a hardware clock signal generator in a computing device (e.g., an integrated circuit, personal computer, or server device) may tick every few nanoseconds or even faster.

As an example, a 10 gigabit Ethernet field programmable gate array (FPGA) has a physical coding sublayer (PCS) that transmits and receives 66 bits for every 64 bits of payload data. Thus, the aggregate bit rate is:

$$\left(\frac{66}{64}\right) \times 10,000,000,000 = 10,312,500,000 \text{ bits/second}$$

The FGPA may be configured to transmit and/or receive one aggregate (66-bit) payload per clock cycle, resulting in a clock frequency of:

$$\frac{10,312,500,000}{66} = 156.25 \text{ megahertz}$$

To achieve this frequency, the clock must tick every 6.4 nanoseconds (and thus it has a period of 6.4 nanoseconds). Alternatively, the extra two bits of payload can be ignored and the clock frequency of 156.25 megahertz can be determined by dividing the bit rate of 10,000,000,000 bits per second by 64 bits per payload to obtain a rate of 156.25 payloads per second.

Similarly, clock frequencies are used by processor buses of computing devices (e.g., connecting processors to main memory and/or other components). These buses may operate at anywhere from 66 megahertz to 800 megahertz in some examples. Multi-gigahertz processor clock frequencies are achieved by applying a multiplier to the bus frequency. For instance, a 133 megahertz bus frequency with a 20× multiplier results in a processor frequency of 2.66 gigahertz.

Thus, while the embodiments herein may be used with various types of clocks disposed within various components of a unit of computing hardware or a computing device, the principles described apply to any of these clocks. For sake of simplicity but without limitation, an FPGA-based packet capture application will be described herein.

Figure 2:
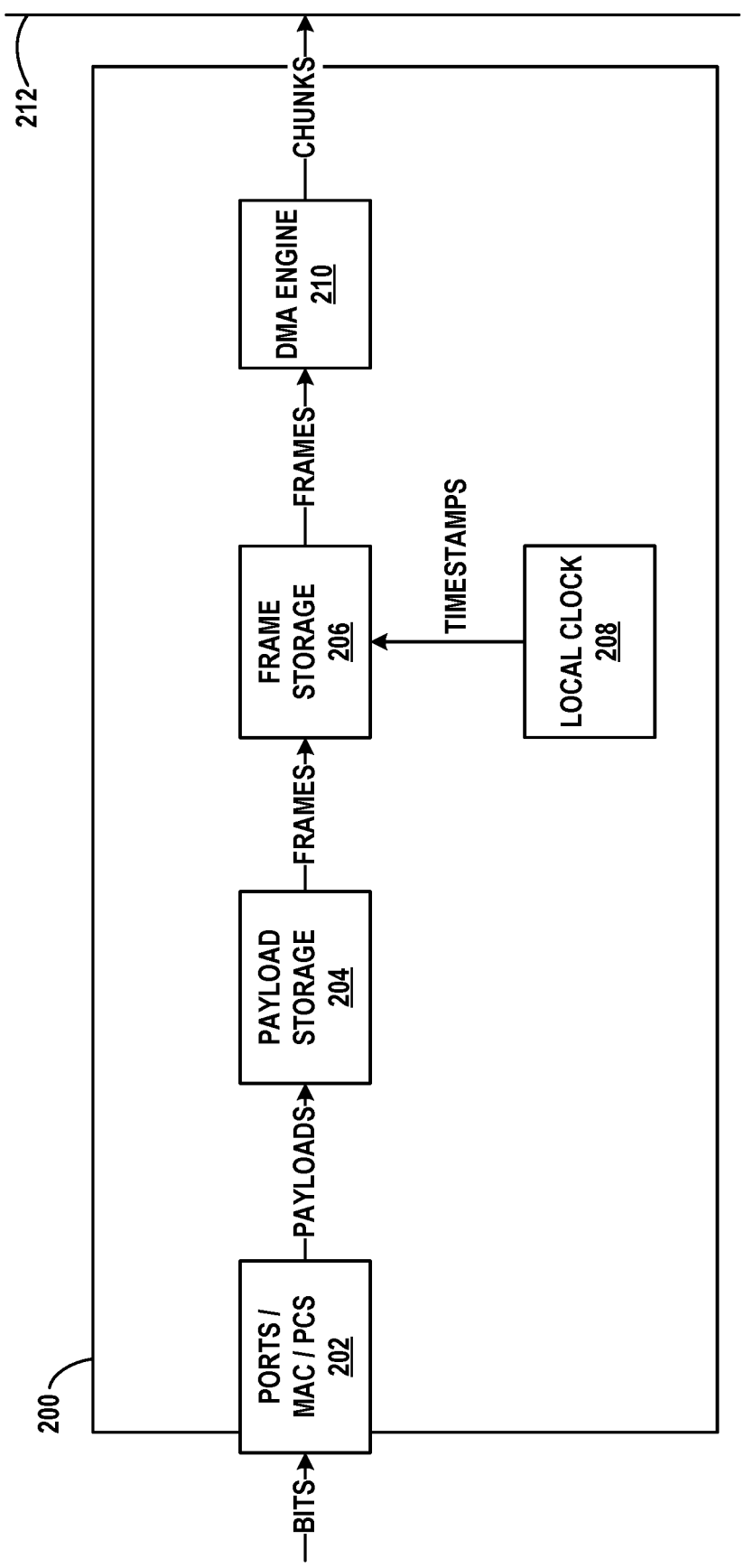
FIG. 2 is a high-level block diagram of an integrated circuit usable for high-speed packet capture applications, in accordance with example embodiments.

To that point, FIG. 2 depicts a high-level block diagram of an FPGA 200 usable for high-speed packet capture applications. FPGA 200 may integrated into a computing device, such as computing device 100, and perhaps as network interface 106.

Ports/MAC/PCS 202 represents one or more physical or virtual Ethernet ports, each possibly with its own medium access control (MAC) and PCS circuitry. Ports/MAC/PCS 202 receives bits, e.g., from a 1 gigabit, 10 gigabit, 40 gigabit, or 100 gigabit Ethernet cable.

Payload storage 204 receives these bits from ports/MAC/PCS 202 in the form of payloads. Each payload may be the amount of bits received during a clock cycle (e.g., for 10 gigabit Ethernet, 64 bits during a 6.4 nanosecond clock cycle). Payload storage 204 may include some form of memory, such as SRAM or DRAM, to temporarily store these payloads until one or more Ethernet frames can be formed therefrom. Here, an Ethernet frame is considered to begin with an Ethernet header (e.g., MAC addresses, Ethertype, and zero or more VLAN tags), end with an Ethernet trailer (e.g. a frame check sequence), and possibly contain a network layer packet (such as an IP packet) in between. Payload storage 204 may include enough memory to store a small number of frames (e.g., 1-10), though larger amounts of memory and thus more storage for frames may be available.

Frame storage 206 may receive such frames and store them until they can be provided to longer-term memory. Thus, frame storage 206 may include a larger amount of SRAM or DRAM (e.g., several megabytes or more) in which frames are placed, e.g., in the order of arrival. Thus, each frame may be associated with some type of metadata that provides this ordering information and other types of information (e.g., a sequence number indicating the ordering of the frame within the context of other received frames, and/or an indication of the port on which the frame arrived).

Local clock 208 may be used write timestamps to the metadata indicating the time at which each frame was written to frame storage 206. In alternative embodiments, these timestamps may be written to payload storage 204 upon reception of the initial or final payload of each frame. Thus, in some embodiments, local clock 208 may write to payload storage 204 instead of frame storage 206, or payload storage 204 may be combined with frame storage 206.

Figure 3:
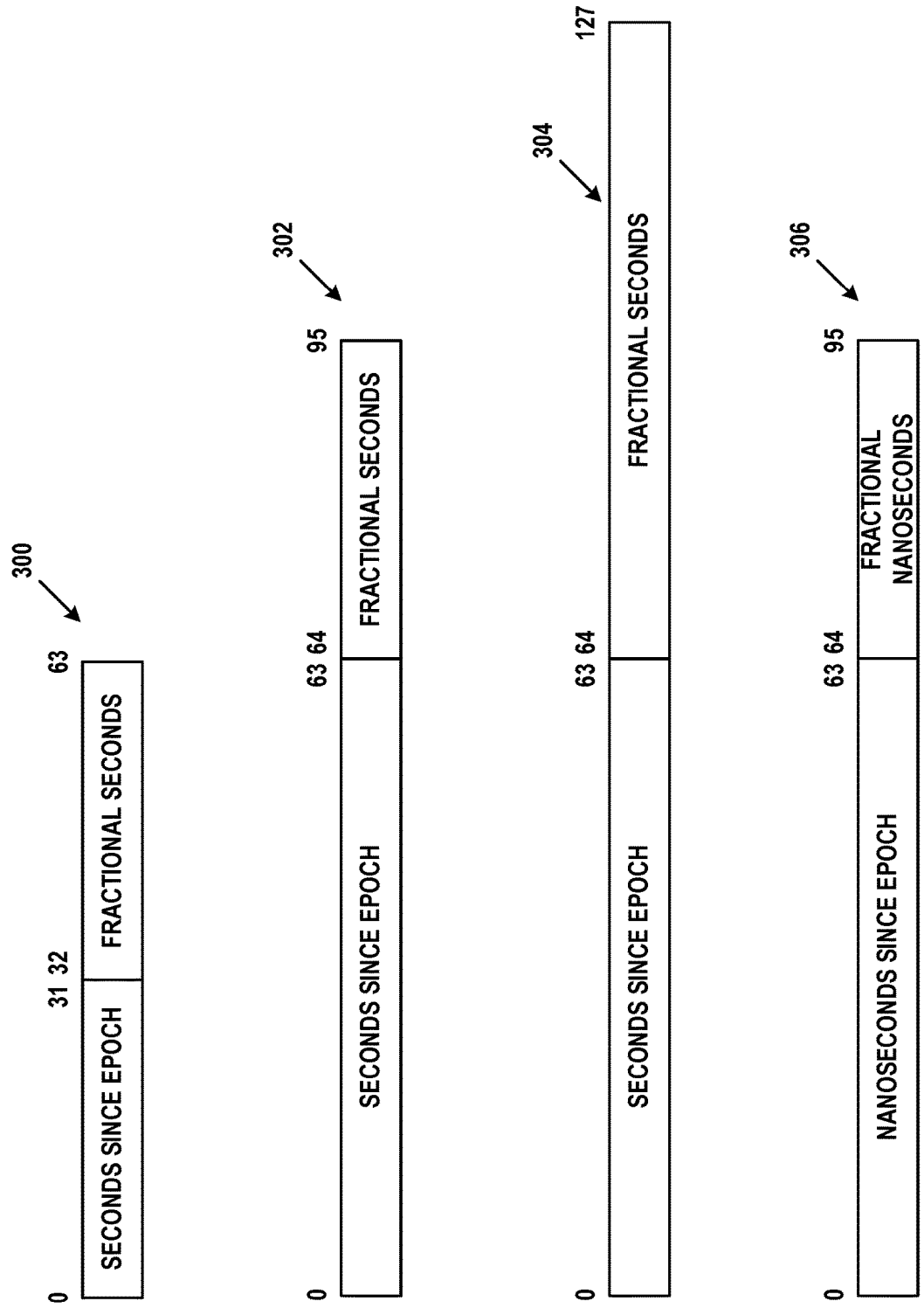
FIG. 3 depicts timestamp formats, in accordance with example embodiments.

Each timestamp may take the form of an NTP timestamp or some other form. For example, each timestamp may be 64 bits, with the 32 most significant bits representing the number of seconds since the NTP epoch (midnight Jan. 1, 1900) and the 32 least significant bits representing fractional seconds. In other words, the fractional seconds run through the entire 32-bit number space each second, in increments of 0.23283 picoseconds). Alternatively, 64 bits may be used for the number of seconds since the NTP epoch, and either 32 or 64 bits may be used for fractional seconds. Turning momentarily to FIG. 3, these timestamp formats are shown in arrangements 300, 302, and 304, respectively.

Unless specified otherwise, the timestamps used for clock disciplining herein may use or be based on arrangement 306, in which 64 bits are used for nanoseconds since the UNIX epoch of midnight Jan. 1, 1970 and 32 bits are used for fractional nanoseconds. Use of such a format may require conversion between this and other formats as needed.

Turning back to FIG. 2, direct memory access (DMA) engine 210 may retrieve chunks of one or more frames from frame storage 206 and write these chunks to main memory (e.g., a separate unit of RAM not shown in FIG. 2) by way of bus 212. Frames that are retrieved and written in this fashion may be deleted from frame storage 206 (e.g., the locations in frame storage 206 containing these frames may be marked as unused).

FIG. 2 provides just one example of an FPGA designed for packet capture. Other examples are possible, including those with different components and/or different arrangements of components. Further, for sake of simplicity, a number of additional components that might be placed on such an FPGA were omitted.

Figure 4:
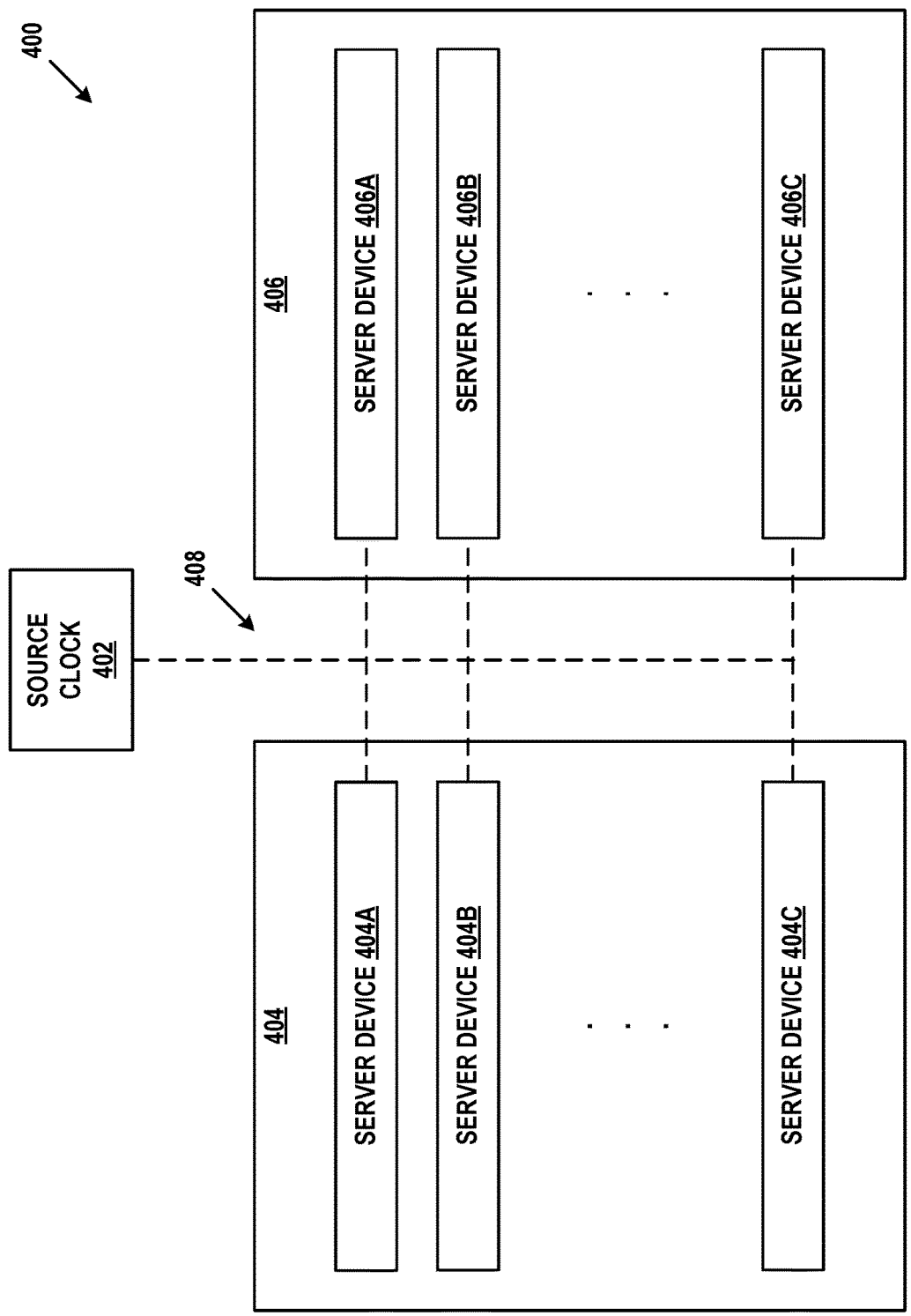
FIG. 4 depicts reference clock distribution in a data center, in accordance with example embodiments.

A data center environment in which maintaining synchronized clocks for packet capture and other applications can be challenging is shown in FIG. 4. Such a data center may be a dedicated location within a building (or the whole building itself) that is used to house arrays of computing devices. These data centers may be densely-packed, and thus subject to high or fluctuating temperatures if not properly cooled and ventilated.

In FIG. 4, data center 400 includes source clock 402, server rack 404, and server rack 406. Source clock 402 serves as a point of distribution of a reference clock to server devices in data center 400. Server rack 404 houses an array of server devices, namely server devices 404A, 404B, and 404C. Likewise, server rack 406 houses another array of server devices, namely server devices 406A, 406B, and 406C. As indicated by the dotted lines, each of server rack 404 and server rack 406 may contain more than three server devices.

Source clock 402 may be a stratum 1, 2, or 3 clock, for example, or may be synchronized to such a source. Regardless, clock source 402 may serve as a reference clock to the local clocks of the server devices in server rack 404 and server rack 406, as shown by the dashed line. Source clock 402 may be connected to these servers by way of a dedicated cable or existing server rack cables.

In accordance with NTP, PTP, or some other clock synchronization protocol, source clock 402 may broadcast timestamps to the server devices and/or the server devices may poll source clock 402 for timestamps. Also in accordance with NTP, PTP, or some other clock synchronization protocol, the server devices may update their local clocks based on such timestamps.

As noted, frequencies of a hardware clock signal generator can vary based on environmental temperature, as well as power source stability (or lack thereof). Modern processors can operate anywhere between 20 and 90 degrees Celsius. These and other components may generate enough heat to cause the temperature of a hardware clock signal generator to be in a similar range. Some studies have shown that hardware clock signal generator designed to operate at 3.5 gigahertz can have their frequencies reduced by about 2 megahertz as temperatures increase from 20 to 47 degrees Celsius. Likewise, these frequencies can be very sensitive to voltage fluctuations. Given this, if a data center is not properly cooled or not properly powered, the frequencies of hardware clock signal generators in the server devices can vary over time.

As just one example, consider the 156.25 megahertz hardware clock signal generator discussed above. This device should tick every 6.4 nanoseconds. Nonetheless, under realistic operating scenarios (and perhaps due to unavoidable design imperfections), it may actually tick every 6.3999959000 to 6.3999959450 nanoseconds, with this value possibly changing for each tick.

While this discrepancy may appear to be small, it can add up quickly into a significant drift. For example, assume that a hardware clock signal generator ticks every 6.3999959000 nanoseconds on average, and that a local clock using this hardware clock signal generator synchronizes periodically (e.g., via NTP or PTP) with a "perfect" reference clock. Thus, these two clocks can be expected to drift 0.0000041 nanoseconds every 6.4 nanoseconds. Therefore, over the course of one second, this drift accumulates to:

$$0.00000406 \times 156{,}250{,}000 = 640.62 \text{ nanoseconds}$$

When timestamps are shown in units of nanoseconds, or when 32 or more bits are used for fractional seconds in a timestamp, this drift is enough to cause noticeable discrepancies between the timestamps based on the reference and local clocks (or possibly between local clocks of different server devices), even if PTP is used to synchronize these clocks once every few seconds. In other words, when comparing timestamps of when packets were transmitted and received by various devices, this modest amount of clock drift can make it appear as if packets were received before they were transmitted, or at least provide an inaccurate representation of the network latencies between devices.

To that point, there are often more than two computing devices involved in a higher-layer (e.g., application-level) transaction, and each of these computing devices may drift at a different rate from the reference clock. Thus, even if all reasonable efforts are undertaken to synchronize the clocks of these computing devices, such synchronization cannot accommodate the high speeds of modern networks.

III. Example Clock Disciplining and Synchronization

Figure 5:
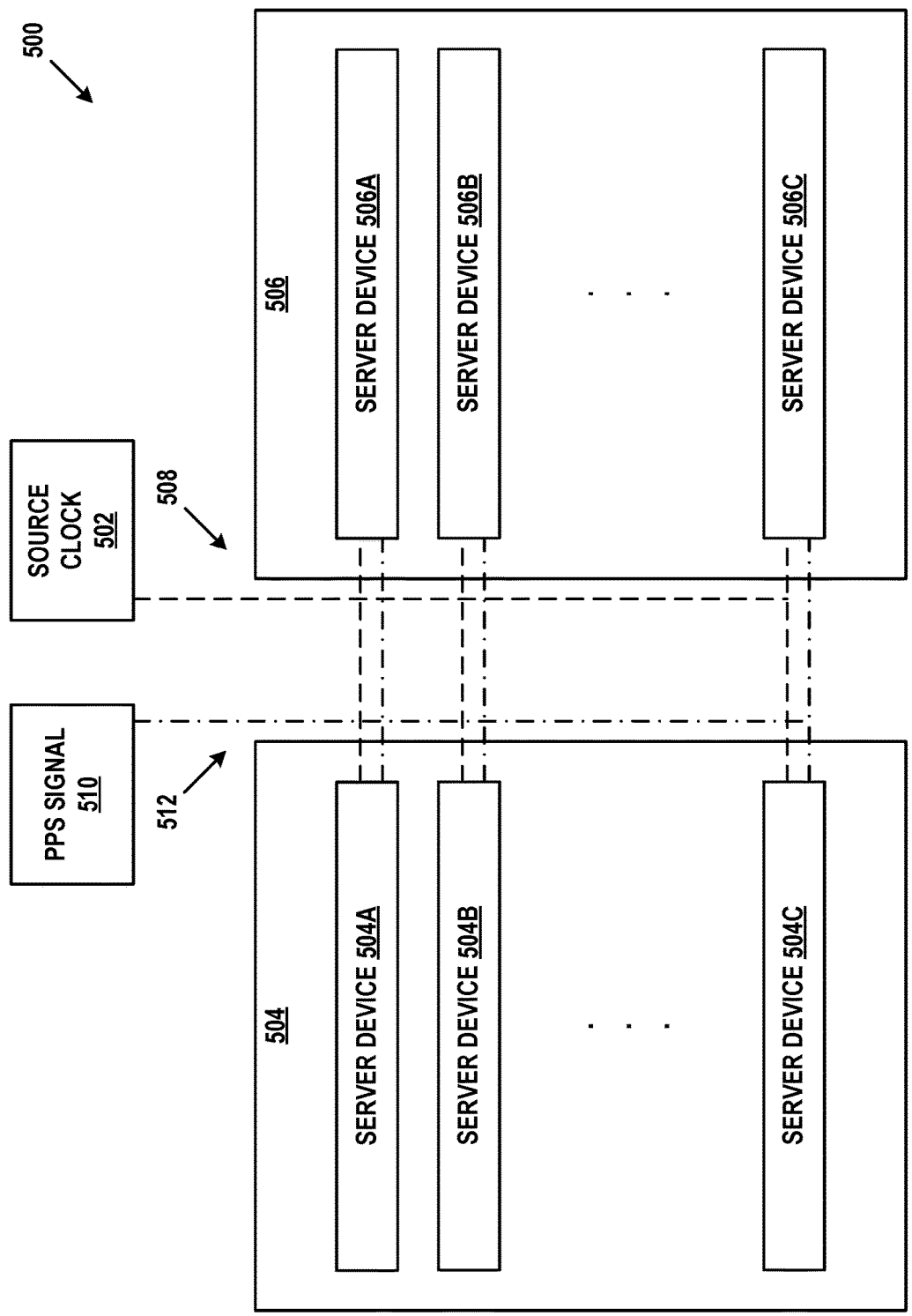
FIG. 5 depicts reference clock and PPS signal distribution in a data center, in accordance with example embodiments.

FIG. 5 depicts a data center 500 that facilitates improved clock disciplining and synchronization. The architecture of data center 500 is largely identical to that of data center 400, in that source clock 502 provides timestamps (e.g., NTP or PTP) by way of cable 508 to server devices 504A, 504B, and 504C in rack 504, and to server devices 506A, 506B, and 506C in rack 506.

Newly introduced in data center 500 is pulse-per-second (PPS) signal 510, which is also provided to server devices 504A, 504B, and 504C in rack 504, and to server devices 506A, 506B, and 506C in rack 506. This signal traverses cable 512.

PPS signal 510 produces signals once per second, with the rising edges of such signals aligned to that of UTC seconds. Thus, in some embodiments, PPS signal 510 has a sharply rising edge, a signal plateau length of less than one second (typically 10-100 milliseconds), and a sharply falling edge at some point during each second. It is assumed that the rising edges (and possible the falling edges as well) are exactly one reference second apart. Thus, PPS signal 510 may be derived from a GPS receiver or a high-precision oscillator that is synchronized to UTC seconds. Regardless, for purposes of the embodiments here, PPS signal 510 is assumed to be a ground truth source of pulses that have a fixed frequency of exactly one pulse per second.

In this manner, PPS signal 510 alone or the combination of source clock 502 and PPS signal 510 may be considered a reference clock. Thus, source clock 502 and PPS signal 510 may be provided by the same physical device, and therefore cables 508 and 512 may be a common set of cables for distributing timestamps and PPS signal 510. For example, PPS signal 510 may be provided to the server devices by way of dedicated coaxial cables plugged into the server devices. But it is relevant to note that source clock 502 and PPS signal 510 deliver two distinct functions— timestamps and indications of second boundaries, respectively. These values might not be synchronized with one another—in other words a timestamp from source clock 502 that is transmitted on a one-second boundary per PPS signal 510 might have a non-zero fractional second.

The distribution of PPS signal 510 to the server devices may facilitate these server devices synchronizing their local clocks, or at least the timestamps generated by these local clocks, to with into a few nanoseconds of one another. This level of accuracy is not possible with NTP or PTP. Further, this synchronization occurs independently at each server device, avoiding further communication overhead between server devices.

At a high level, two values are derived per server device. The first is a local time increment (TimeInc), which represents the amount by which the local time value of the server device's local clock (LocalTime) is increased in response to each of its ticks. Thus:

$$LocalTime = LocalTime + TimeInc$$

Note that TimeInc typically exists in a local clock as a fixed value, set to the clock period of the hardware clock signal generator as designed. But since this clock period can vary in practice, the embodiments herein allow TimeInc to be adjusted accordingly.

The second is a time offset (TimeOffset), which represents a skew between when the local clock reaches a one-second boundary (e.g., when the local clock's value for fractional seconds is zero) and the absolute value of the reference clock. Timestamps used by applications are the sum of LocalTime and TimeOffset. In other words:

$$Timestamp = LocalTime + TimeOffset$$

Thus, Timestamp represents LocalTime with one-second boundaries aligned by TimeOffset to the PPS signal. This means that, in an ideal scenario, Timestamp has zero fractional seconds on the rising edges of the PPS signal. This alignment may not be perfect due to fluctuations in hardware clock signal generator frequency and drift between the local clock and the PPS signal, but can be made to be within a few nanoseconds.

All of these values may be measured in nanoseconds, as one possible example. Further each of the values for TimeInc and TimeOffset is calculated and maintained independently from one another so that they can be freely adjusted during operation to account for changes in the hardware clock signal generator's period, changes in the skew between the local clock and the PPS signal, and ad hoc changes to the absolute value of the reference clock (e.g., to accommodate for leap seconds). Note that LocalTime and/or TimeOffset may also be synchronized using NTP or PTP as needed or per normal operation.

The embodiments herein provide mechanisms for dynamically determining TimeInc and TimeOffset on an ongoing basis. The mechanisms for each are described separately for purposes of illustration, but can be combined and may occur simultaneously in practice. Through use of these embodiments, local clocks on multiple computing devices can be used to generate timestamps that correct for both drift as well as phase offset between clocks.

A. Determining a Time Increment

As noted above, the time increment (TimeInc) represents the amount by which the local time value of the server device's local clock is increased in response to ticks of an associated hardware clock signal generator. It is assumed that the hardware clock signal generator is designed to operate with some preconfigured clock period (e.g., 6.4 nanoseconds for 10 gigabit per second Ethernet hardware) and but can drift from this clock period due to environmental influences. To accommodate this drift on an ongoing basis, TimeInc is dynamically adjusted.

At a high level, this process involves receiving the PPS signal periodically (e.g., once every second). For example, on the rising edge of the PPS signal, a lead connected to the server device (e.g., a wire of a serial port, parallel port, or some other interface) may change state. This state change may be detected by hardware, driver software, or firmware, and the driver may send an interrupt to the operating system of the server device. This interrupt may cause the current local time value to be written to a register of the server device. Alternatively, hardware can sample, to the register, the local time value on the rising edge and wait for software to read the value in the register at a later time. Thus, the register stores the most recent local time value (e.g., in nanoseconds since the UNIX epoch) when a rising edge was detected in the PPS signal. Alternatively, the PPS signal may be polled.

Possibly in an asynchronous manner to the recording of the local time value in the register, the following algorithm is performed once per second. In short, the difference between the most recent local time value and the previously recorded local time value is calculated to determine a difference between the length of a second as measured by the local clock and the length of a second as measured by the PPS signal.

Figure 6:
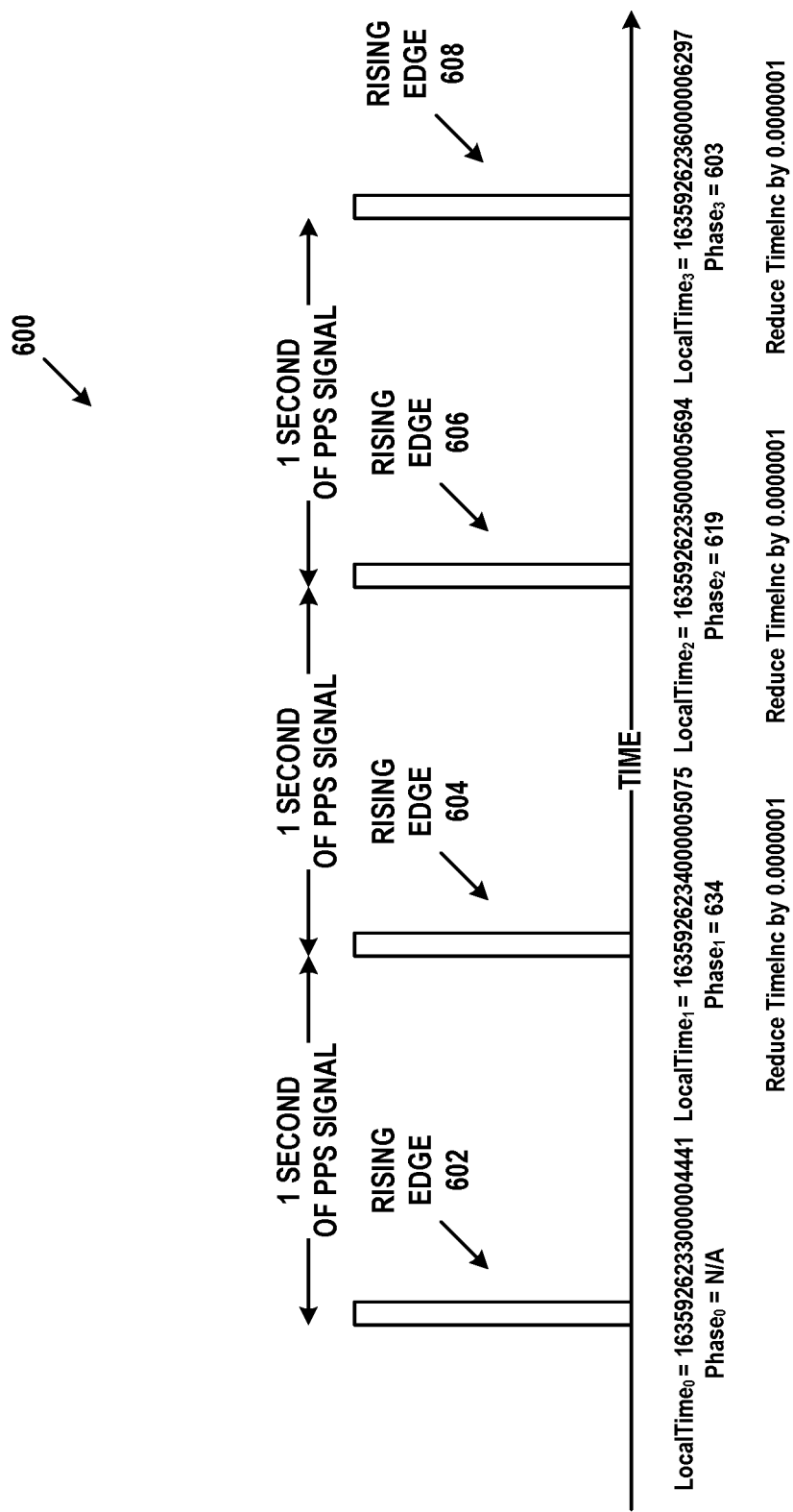
FIG. 6 depicts a timing diagram, in accordance with example embodiments.

This process is illustrated in timing diagram 600 of FIG. 6. Timing diagram 600 includes four sequential rising edges of a PPS signal, rising edges 602, 604, 606, and 608. Each of these is 1 second apart, per the timing of the PPS signal (which again is assumed to be ground truth UTC time).

Below each rising edge is its associated local time value (i.e., the value of LocalTime recorded in response to receiving the PPS signal. The hardware clock signal generator is assumed to have a designed clock period of 6.4 nanoseconds, and thus ticks at 156.25 megahertz (156,250,000 times per second). Nonetheless, as noted, the hardware clock signal generator's actual clock period (when compared to PPS signal timing) may vary, and therefore can be shorter or longer than 6.4 nanoseconds at any given instant. Such a discrepancy can be found by determining the phase between each sequential pair of local time values. Formally, at the nth second of the PPS signal:

$$\text{Phase}_n = LocalTime_n - LocalTime_{n-1} - 1$$

As shown in FIG. 6, LocalTime$_0$ measured at rising edge 602 is 1635926233000004441 nanoseconds and LocalTime$_1$ measured at rising edge 604 is 1635926234000005075 nanoseconds. Thus, Phase$_1$ is 634 nanoseconds. This means that a second as measured by the local clock was 634 nanoseconds longer than that of the PPS signal. In other words, the period of the hardware clock signal generator was slightly longer than its designed value of 6.4 nanoseconds.

Based on the sign and magnitude of Phase$_n$, TimeInc can be set to a new value that is larger or smaller than its previous value. Thus, the effective length of a second as measured by LocalTime gets slightly longer or slightly shorter. This technique can be used to bring the length of a second as determined by the local clock to be closer to the length of a second as determined by the PPS signal. In other words, the rate that the local time value increases becomes closer to the rate of increase of a reference clock based on the PPS signal.

For the first pair of measurements and the calculated value of Phase$_1$, TimeInc is reduced by 0.0000001 nanoseconds (i.e., from 6.4 nanoseconds to 6.3999999 nanoseconds, assuming that TimeInc was previous 6.4 nanoseconds). Multiplied by the hardware clock signal generator frequency of 156.25 megahertz, this results in a decrease of approximately 15.625 nanoseconds per second, which is less that the phase offset of 634 nanoseconds. Nonetheless, such a gradual reduction prevents jittery timestamps and in practice converges within a few minutes of operation or less.

In the second pair of measurements, LocalTime$_1$ measured at rising edge 604 is 1635926234000005075 nanoseconds and LocalTime$_2$ measured at rising edge 606 is 1635926235000005694 nanoseconds. Thus, Phase$_2$ is 619 nanoseconds. Then, TimeInc is again reduced by 0.0000001 nanoseconds (i.e., from 6.3999999 nanoseconds to 6.3999998 nanoseconds). This also results in a decrease of approximately 15.625 nanoseconds per second.

In the third pair of measurements, LocalTime$_2$ measured at rising edge 606 is 1635926235000005694 nanoseconds and LocalTime$_3$ measured at rising edge 608 is 1635926236000006297 nanoseconds. Thus, Phase$_3$ is 603 nanoseconds. Then, TimeInc is again reduced by 0.0000001 nanoseconds (i.e., from 6.3999998 nanoseconds to 6.3999997 nanoseconds). Once again, this results in a decrease of approximately 15.625 nanoseconds per second.

The process continues updating TimeInc each second to account for changes in frequency of the hardware clock signal generator (e.g., due to temperature shifts or voltage instability). In the examples of FIG. 6, the phase is positive and therefore TimeInc is reduced. But when the phase is negative, TimeInc can be increased in a similar fashion.

In some embodiments, a smoothed version of the phase may be used so that occasional spikes in phase do not have an outsized impact on TimeInc. As one example, an exponentially weighted moving average of the phase may be calculated as:

$$PhaseEMA_n = (1 - \alpha) \times PhaseEMA_{n-1} + \alpha \times \text{Phase}_n$$

Where a takes on a value between 0 and 1. For example, with a value of $\alpha = 0.1$ for the weighting factor, the weighted moving average of the phase for the examples in FIG. 6 are PhaseEMA$_1$=634, PhaseEMA$_2$=632.5, and PhaseEMA$_3$=617.4.

Whether the raw phase values or the smoothed versions thereof are used, the magnitudes of these values may be used to determine the amount that TimeInc is adjusted. In general, the adjustment grows or scales, possibly in a proportionate fashion, with these magnitudes. In one possible example, the adjustment is based on the absolute value of the exponentially weighted moving average of the phase in accordance with the following table.

| |PhaseEMA$_n$| | TimeInc Adjustment |
|---|---|
| ≥100 | 0.0000001 nanoseconds |
| ≥10 and <100 | 0.00000001 nanoseconds |
| ≥1 and <10 | 0.000000001 nanoseconds |
| <1 | 0.0000000001 nanoseconds |

As noted above, the sign of the adjustment is the same as that of the raw phase values or the smoothed versions thereof, whichever is used. In this fashion, over the course of a few minutes, the actual hardware clock signal generator period can be accurately estimated. Further, as this period changes over time, this algorithm is constantly running to cause TimeInc to be adjusted so that the length of a second as represented in LocalTime is closer to the length of a second as provided by the reference clock.

In experiments, the accuracy of this match can be within 10 nanoseconds. In practice, the system is typically run for several minutes in order for the value of TimeInc to stabilize before the local clock is considered to be synchronized with the PPS signal.

Figure 7:
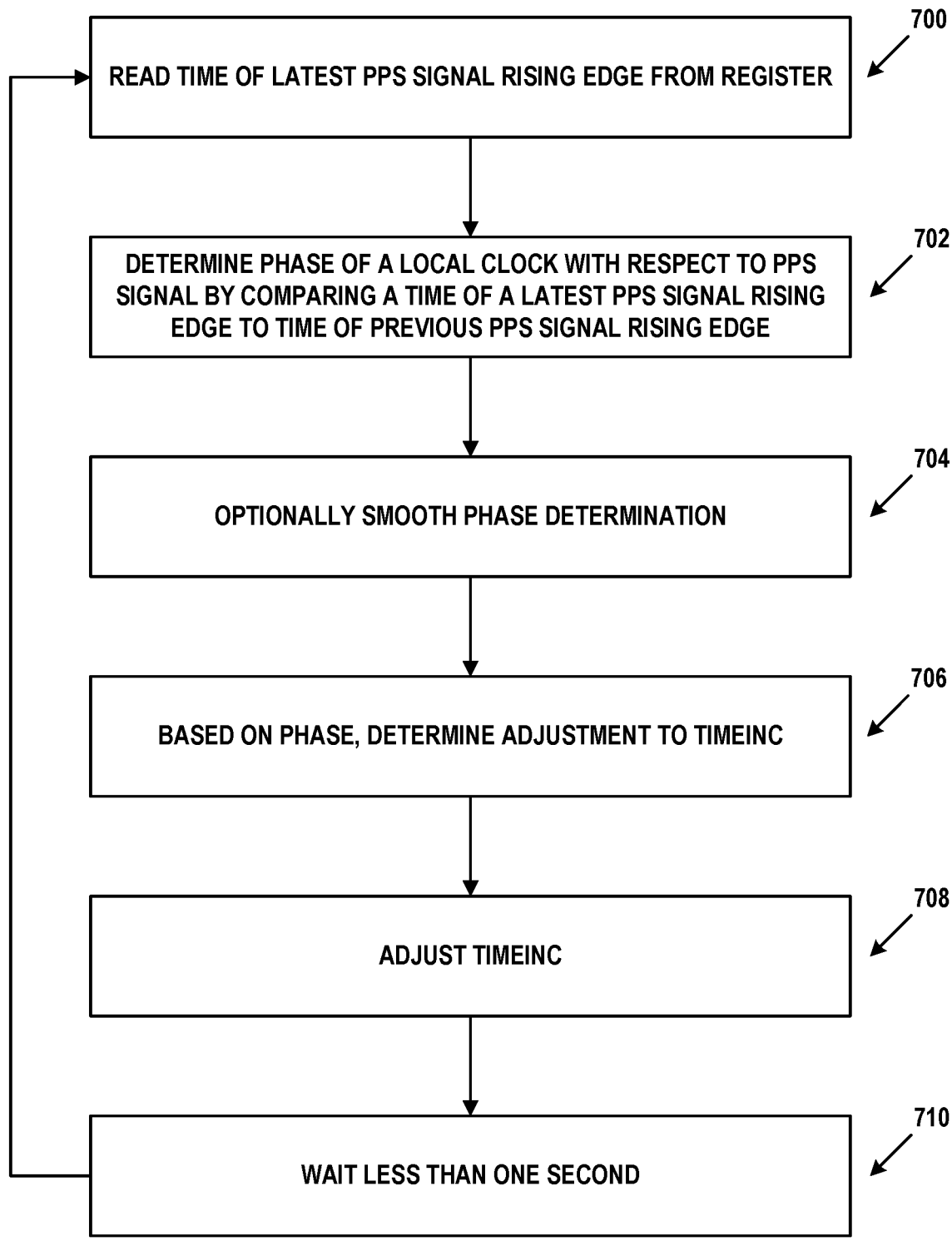
FIG. 7 is a flow chart for adjusting a clock period, in accordance with example embodiments.

FIG. 7 depicts a representation of the full algorithm for updating TimeInc. Variations of this algorithm may be possible.

At block 700, the time of the latest PPS signal rising edge (e.g., the local time value of the local clock) is read from a register. At block 702, the phase of the local clock with respect to the PPS signal is determined by comparing the time of the latest PPS signal rising edge from the register to the time of the previous PPS signal rising edge (which is assumed to be stored in a variable). At block 704, the phase determination is optionally smoothed. At block 706, based on the phase (or the smoothed version) an adjustment to TimeInc is determined. At block 708, this adjustment is made (e.g., by writing to a register or other memory location that stores the local time increment). At block 710, the software or firmware waits (sleeps) for less than one second before returning to the top of the loop at block 700. Note that this waiting period need not be one second and can instead take on smaller or larger values.

In some embodiments, the server device maintains an incrementing count of PPS rising edge signals. The process illustrated by FIG. 7 might only be performed if the current value of this count is greater than its previous value (thus indicating that a rising edge of the PPS signal has been received since the last adjustment to the local clock period).

B. Determining a Time Offset

Independently or in conjunction with the determination of TimeInc, a computing device may also determine TimeOffset, which represents a skew (difference) between the rising edge of the PPS signal and when the local clock reaches a one-second boundary. Once TimeOffset is determined, it can be applied to timestamps written by the server device so that these timestamps are synchronized (in phase) with the rising edges of the PPS signal and/or match the time provided by the reference clock.

At a high level, this process involves reading the local clock's local timestamp (which includes the current value of TimeOffset) that was written to a register of the server device on the most recent rising edge of the PPS signal. This value may be, for example, the number of nanoseconds since the UNIX epoch. Then a modulus of 1,000,000,000 may be applied to the value to determine the fractional seconds of this value. These factional seconds represent the skew and can be used directly as TimeOffset. In other words, where $TimeOffset_m$ is the instantaneous skew determined at time m:

$$TimeOffset_m = Timestamp_m \bmod 1{,}000{,}000{,}000$$

However, it may be advantageous to only apply TimeOffset to timestamps when a smoothed version of TimeOffset is within a particular range of TimeOffset. Doing so may reduce the impact of PPS signal measurement outliers, and avoid situations that would cause TimeOffset to wildly fluctuate.

As one example, an exponentially weighted moving average of the skew may be calculated as:

$$TimeOffsetEMA_m = (1 - \beta) \times TimeOffsetEMA_{m-1} + \beta \times TimeOffset_m$$

Where $\beta$ takes on a value between 0 and 1. TimeOffset might only be applied to timestamps when the following relation holds $$|TimeOffset_m| < 10 \times |TimeOffsetEMA_m|$$

Values other than 10 may be used as a scaling factor. Then a timestamp may be generated as:

$$Timestamp = LocalTime + TimeOffset$$

Recall that LocalTime is incremented by TimeInc every hardware clock signal generator period, and thus will change at a relatively regular rate. In any event, an example of how these calculations are performed in practice can be found in the table below.

| | TimeOffset | Timestamp | Delta |
|---|---|---|---|
| 1 | −18049 | 1635926354000000007 | 7 |
| 2 | −18056 | 1635926354999999995 | −5 |
| 3 | −18051 | 1635926356000000008 | 8 |
| 4 | −18059 | 1635926357000000001 | 1 |
| 5 | −18060 | . . . | . . . |

At time 1, TimeOffset is assumed to be −18049 nanoseconds, as determined during operation of the server device to this point, and Timestamp is found to be 1635926354000000007 nanoseconds. Thus, Delta is 7 nanoseconds, which gets subtracted from TimeOffset. Here, Delta represents the difference between the timestamp as measured and its nearest one-second boundary (the one-second boundary defines when the reference clock has a value of 0 for its fractional seconds).

Therefore, at time 2, TimeOffset is −18056. Timestamp is found to be 1635926354999999995 nanoseconds. Thus, Delta is −5 nanoseconds, which gets subtracted from TimeOffset.

Therefore, at time 3, TimeOffset is −18051. Timestamp is found to be 1635926356000000008 nanoseconds. Thus, Delta is 8 nanoseconds, which gets subtracted from TimeOffset.

Therefore, at time 4, TimeOffset is −18059. Timestamp is found to be 1635926357000000001 nanoseconds. Thus, Delta is 1 nanosecond, which gets subtracted from TimeOffset.

Therefore, at time 5, TimeOffset is −18060. This process may continue any number of further iterations. Advantageously, the time offset is accurately calculated each second. In this manner, a number of server devices receiving the same PPS signal can generate timestamps that have second boundaries approximately synchronized with the PPS signals and/or to NTP/PTP time.

These nanosecond timestamps can be converted to a human-readable date. For example, the timestamp 1635926354000000007 represents Wednesday, Nov. 3, 2021 7:59:14 AM in GMT.

Figure 8:
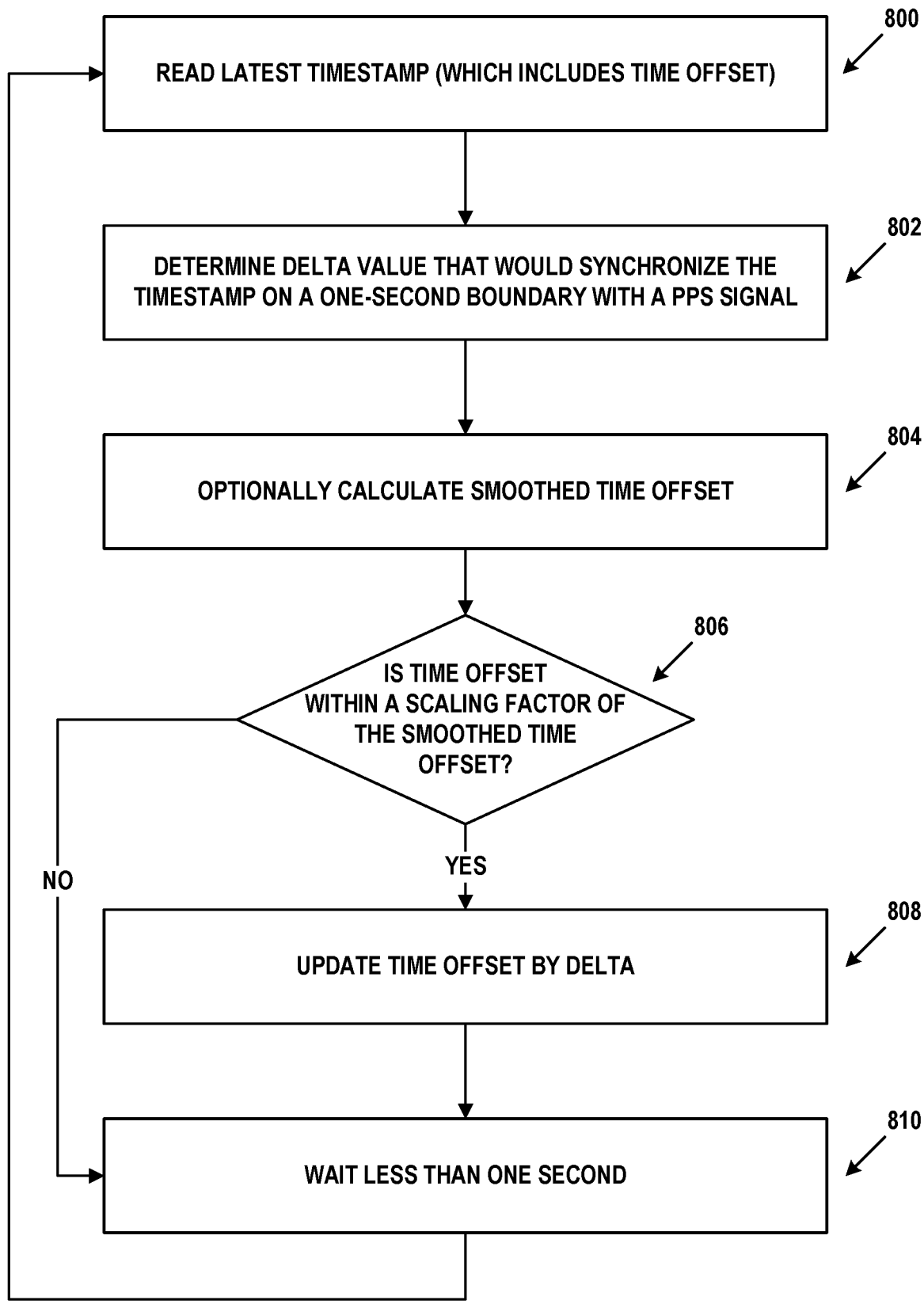
FIG. 8 is a flow chart for determining a time offset, in accordance with example embodiments.

FIG. 8 depicts a representation of the full algorithm for updating TimeOffset. Variations of this algorithm may be possible.

At block 800, the latest timestamp is read from a register. This timestamp includes the time offset and might or might not be approximately synchronized with the PPS signal due to clock drift among other factors. The timestamp may have been written to the register on the rising edge of the PPS signal. As discussed below in the context of FIG. 10, timestamps with and without TimeOffset applied may be written to separate registers in response to reception of the PPS signal, or a single timestamp value (e.g., with TimeOffset applied) may be written and TimeOffset may be derived therefrom.

At block 802, a delta is determined that would synchronize the timestamp on a one-second boundary with a PPS signal. At block 804, a smoothed time offset is optionally calculated (if the time offset is not smoothed at this block, then control passes to block 808). At block 806, it is determined whether the time offset is within a scaling factor of the smoothed time offset. If so, control passes to block 808, where the delta value is subtracted from the time offset). Otherwise control passes to block 810. At block 810, the software or firmware waits (sleeps) for less than one second before returning to the top of the loop at block 800. Note that this waiting period need not be one second and can instead take on smaller or larger values.

In some embodiments, the server device maintains an incrementing count of PPS rising edge signals. The process illustrated by FIG. 8 might only be performed if the current value of this count is greater than its previous value (thus indicating that the PPS signal has been received since the last calculation of the time offset).

C. Example Computing Device and Implementation

Figure 9:
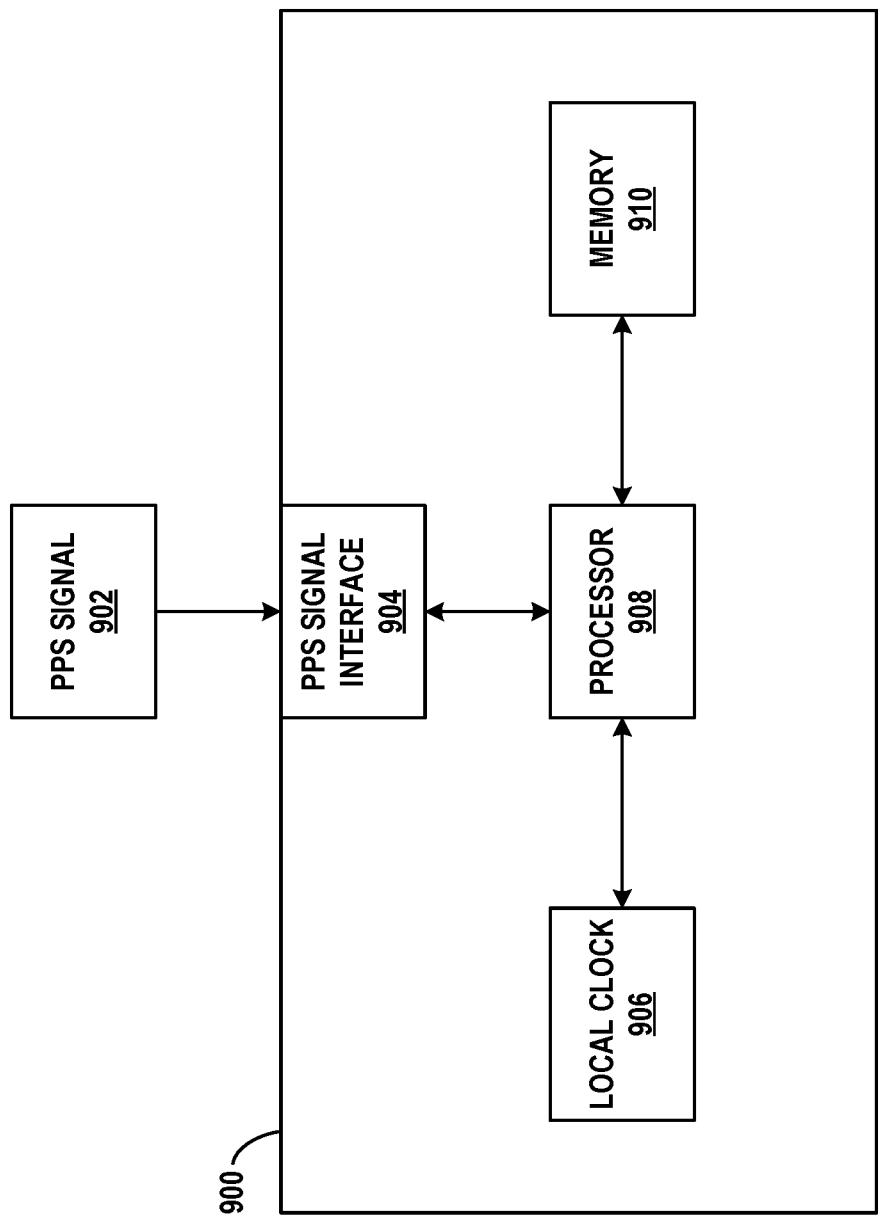
FIG. 9 is a simplified schematic of a computing device, in accordance with example embodiments.

FIG. 9 provides a high-level schematic of a computing device 900 configured to operate in accordance with the embodiments herein. Such a computing device may be a variation of computing device 100 and/or may represent one of the server devices in FIG. 5.

Computing device 900 receives PPS signal 902 by way of PPS signal interface 904. Processor 908 is in communication with local clock 906 and memory 910. In this fashion, processor 908 may read values from PPS signal interface 904 and local clock 906, and uses these values to determine the time increments and time offsets between these timing sources. These values, variations thereof, and intermediate values may be stored in memory 910 as needed.

In some embodiments, other communication pathways may be possible. For example, PPS signal interface 904 and/or local clock 906 may be able to write or read more directly to or from memory 910. Regardless, processor 908 may be configured to be able to write timestamps that apply these time increments and time offsets so that computing device 900 operates in a fashion that is time-synchronized with PPS signal 902 as well as other computing devices receiving PPS signal 902 and carrying out the embodiments herein.

Figure 10:
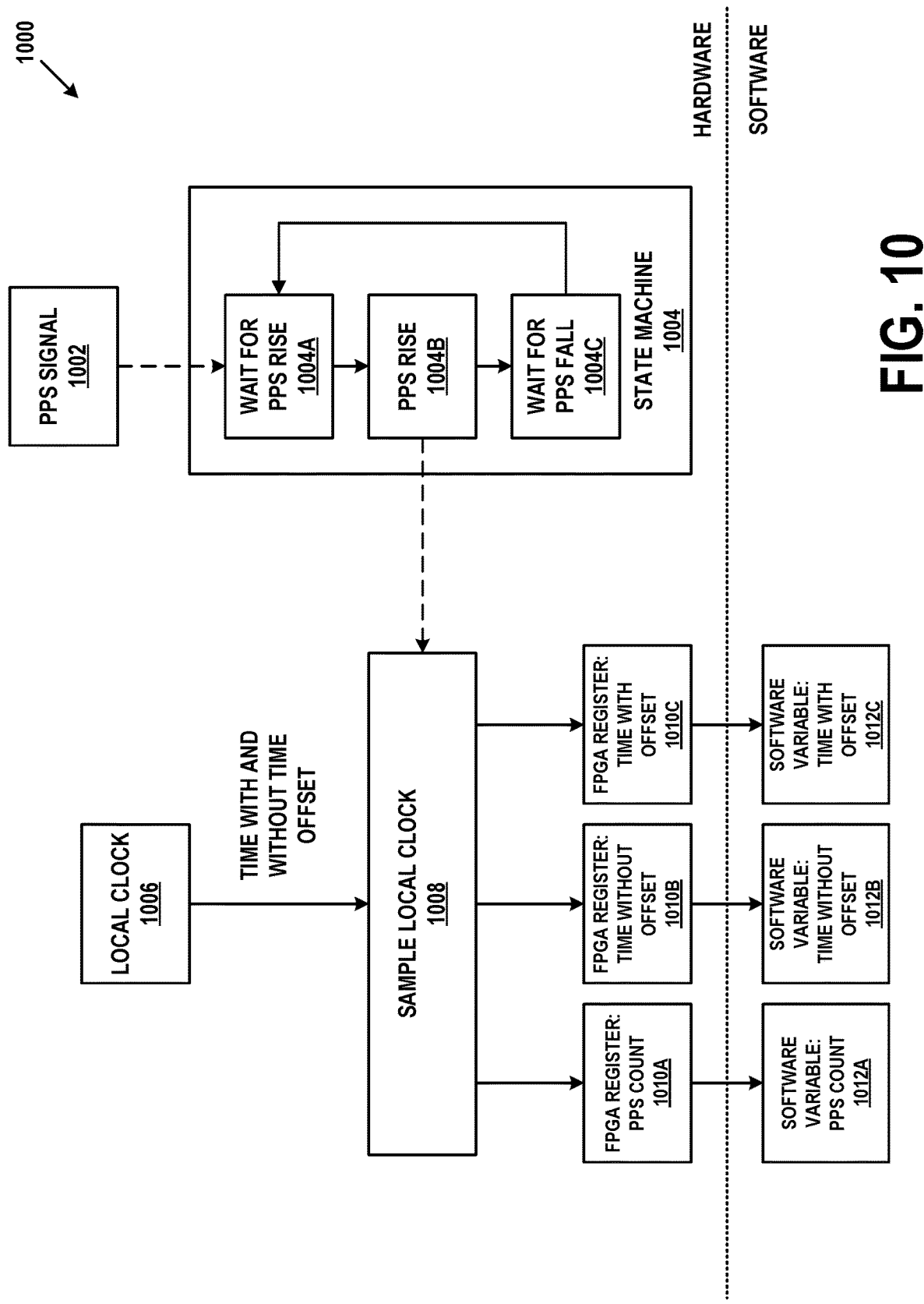
FIG. 10 provides a further view of a computing device with hardware and software functionality, in accordance with example embodiments.

FIG. 10 provides a further view of a computing device 1000 configured to operate in accordance with the embodiments herein, but with example hardware and software functionality differentiated. Particularly, hardware components appear above the dotted line and software data appears below the dotted line. Computing device 1000 may be the same as computing device 900, for example. FIG. 10 illustrates components, data, and logic in blocks.

The hardware of computing device 1000 may constantly execute state machine 1004. This state machine has three states: wait for PPS rising edge 1004A, PPS rising edge 1004B, and wait for PPS falling edge 1004C. PPS signal 1002 may be from a connected GPS device. Thus, state machine 1004 spends most of its time in state 1004A, and then transitions to state 1004B when PPS signal 1002 signals a rising edge. This causes state machine 1004 to enter state 1004B, and entry into this state causes sample local clock step 1008 to be carried out. State machine 1004 then transitions to state 1004C and stays in this state until PPS signal 1002 indicates that the rising edge is over.

Step 1008 samples local clock 1006. Doing so may record the time at local clock 1006 on the rising edge. Depending on implementation, this sample may be just the time (e.g., LocalTime), the time plus the time increment (LocalTime+TimeInc), and/or the time plus the time increment and the running time offset (e.g., LocalTime+TimeInc+TimeOffset).

When step 1008 takes place, a PPS count value is incremented and stored in FPGA register 1010A. Further, the time without the offset is stored in FPGA register 1010B, and the time with the offset added is stored in FPGA register 1010C. In the software, these registers can be read into software variables 1012A, 1012B, and 1012C, respectively.

Once these values are in software, they can be used to carry out the embodiments herein, notably, adjustment of the time increment (e.g., as described in the context of FIG. 7) and of the time offset (e.g., as described in the context of FIG. 8).

IV. Example Operations

Figure 11:
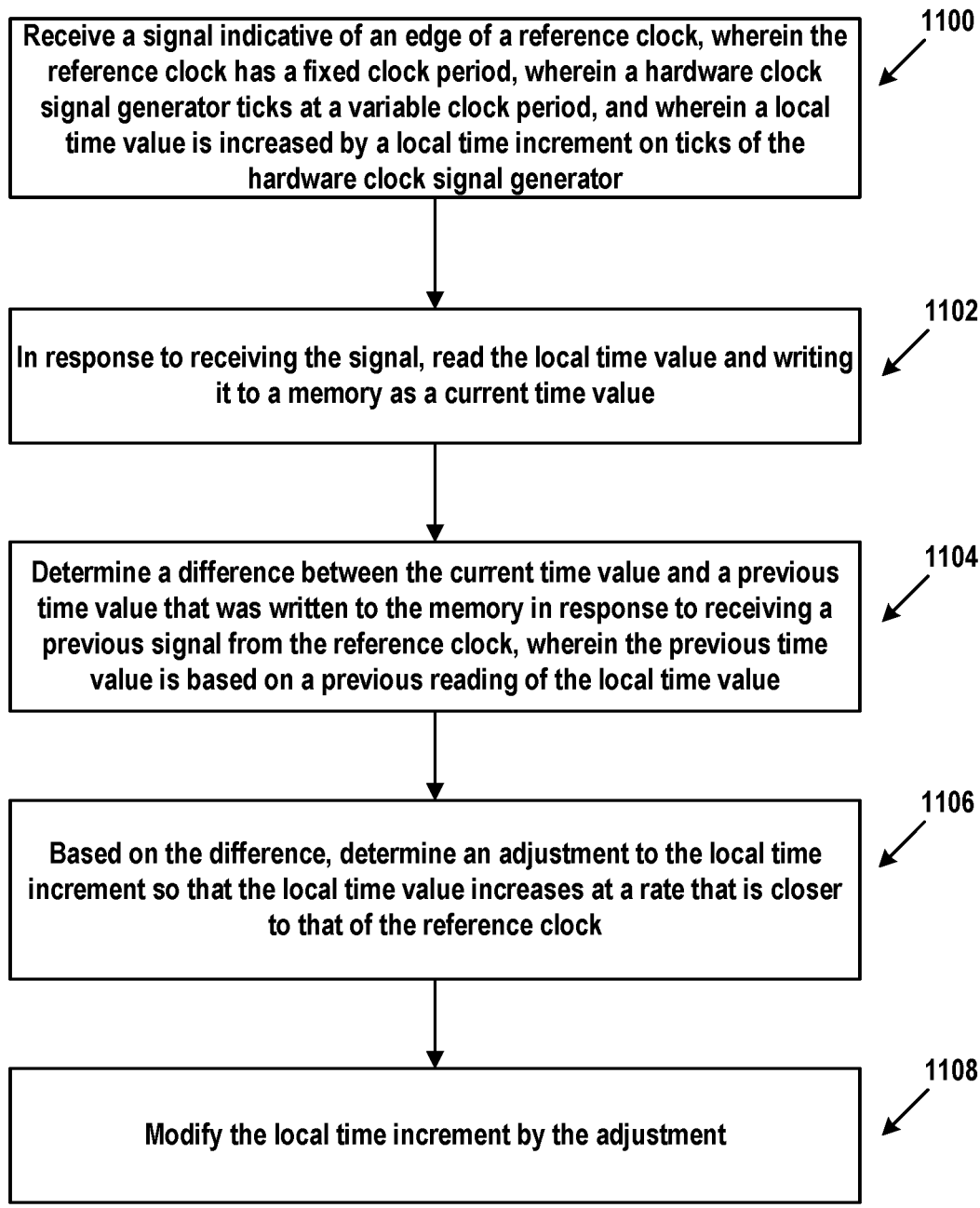
FIG. 11 is a flow chart, in accordance with example embodiments.

FIG. 11 is a flow chart illustrating an example embodiment. The process illustrated by FIG. 11 may be carried out by a computing device, such as computing device 900 or computing device 1000. However, the process can be carried out by other types of devices or device subsystems. For example, the process could be carried out by an FPGA-based network interface of a packet capture device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve receiving a signal indicative of an edge of a reference clock, wherein the reference clock has a fixed clock period, wherein a hardware clock signal generator ticks at a variable clock period, and wherein a local time value is increased by a local time increment on ticks of the hardware clock signal generator.

Block 1102 may involve, in response to receiving the signal, reading the local time value and writing it to a memory as a current time value.

Block 1104 may involve determining a difference between the current time value and a previous time value that was written to the memory in response to receiving a previous signal from the reference clock, wherein the previous time value is based on a previous reading of the local time value.

Block 1106 may involve, based on the difference, determining an adjustment to the local time increment so that the local time value increases at a rate that is closer to that of the reference clock.

Block 1108 may involve modifying the local time increment by the adjustment.

In some embodiments, the signal is a pulse-per-second (PPS) signal and the fixed clock period is one second.

In some embodiments, receiving the signal causes an interrupt to trigger execution of a software or firmware routine that reads the local time value and writes the local time value to the memory.

In some embodiments, the edge of the reference clock is a rising edge.

Some embodiments may involve: receiving a further signal indicative of a further edge of the reference clock; in response to receiving the further signal, reading the local time value and writing it to the memory as a further current time value; determining a further difference between the further current time value and the current time value; based on the further difference, determining a further adjustment to the local time increment so that the local time value increases at a further rate that is closer to that of the reference clock; and modifying the local time increment by the further adjustment.

In some embodiments, the difference is greater than the fixed clock period, wherein the difference being greater than the fixed clock period causes the adjustment to be negative.

In some embodiments, the difference is less than the fixed clock period, wherein the difference being less than the fixed clock period causes the adjustment to be positive.

In some embodiments, a magnitude of the adjustment is proportional to an absolute value of the difference.

In some embodiments, determining the difference between the current time value and the previous time value comprises determining a smoothed difference based on the difference and a weighting factor, wherein determining the adjustment to the local time increment is based on the smoothed difference.

In some embodiments, the smoothed difference is based on an exponentially-weighted moving average that uses the weighting factor.

Some embodiments may involve generating a timestamp from the local time value.

Some embodiments may involve writing the timestamp to a network packet stored in the memory or to metadata associated with the network packet.

Some embodiments may involve: reading, from the memory, a latest timestamp that is based on the local time value and a time offset; determining a new time offset that would phase-synchronize the latest timestamp with the signal on a boundary defined by the fixed clock period; setting the time offset to the new time offset; and applying the time offset to the latest timestamp.

Some embodiments may involve, in response to receiving the signal, writing the latest timestamp to the memory.

In some embodiments, determining the new time offset comprises: determining a delta value to apply to the time offset; and determining a smoothed delta value based on the delta value and a weighting factor, wherein setting the time offset is caused by an absolute value of the delta value being less than an absolute value of the smoothed delta value multiplied by a scaling factor.

In some embodiments, the smoothed delta value is based on an exponentially-weighted moving average that uses the weighting factor.

V. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   receiving a signal indicative of a reference clock, wherein a local time value is increased by a local time increment on ticks of a hardware clock signal generator;
   reading the local time value as a current time value;
   determining a difference between the current time value and a previous time value that is based on a previous reading of the local time value;
   based on the difference, determining an adjustment to the local time increment so that the local time value increases at a rate that is closer to that of the reference clock; and
   modifying the local time increment by the adjustment.

2. The method of claim 1, wherein the reference clock has a fixed clock period, and wherein a hardware clock signal generator ticks at a variable clock period.

3. The method of claim 1, wherein the signal indicative of the reference clock is indicative of an edge of the reference clock.

4. The method of claim 3, wherein the edge of the reference clock is a rising edge.

5. The method of claim 1, further comprising:
   in response to reading the local time value as the current time value, writing the current time value to a memory.

6. The method of claim 1, wherein the previous time value was written to a memory in response to receiving a previous signal from the reference clock, and wherein determining the difference between the current time value and the previous time value comprises reading the previous time value from the memory.

7. The method of claim 1, wherein the signal indicative of the reference clock is a pulse-per-second (PPS) signal.

8. The method of claim 1, wherein receiving the signal indicative of the reference clock causes an interrupt to trigger execution of a software or firmware routine that reads the local time value.

9. The method of claim 1, further comprising:
   receiving a further signal indicative of the reference clock;
   in response to receiving the further signal, reading a further local time value as a further current time value;
   determining a further difference between the further current time value and the current time value;
   based on the further difference, determining a further adjustment to the local time increment so that the local time value increases at a further rate that is closer to that of the reference clock; and
   modifying the local time increment by the further adjustment.

10. The method of claim 1, wherein the difference is greater than a period of the reference clock, and wherein the difference being greater than the period causes the adjustment to be negative.

11. The method of claim 1, wherein the difference is less than the a period of the reference clock, and wherein the difference being less than the period causes the adjustment to be positive.

12. The method of claim 1, wherein a magnitude of the adjustment is proportional to an absolute value of the difference.

13. The method of claim 1, wherein determining the difference between the current time value and the previous time value comprises determining a smoothed difference based on the difference and a weighting factor, and wherein determining the adjustment to the local time increment is based on the smoothed difference.

14. The method of claim 13, wherein the smoothed difference is based on an exponentially-weighted moving average that uses the weighting factor.

15. The method of claim 1, further comprising:
   generating a timestamp from the local time value; and
   writing the timestamp to a network packet or to metadata associated with the network packet.

16. The method of claim 1, further comprising:
   generating a timestamp from the local time value;
   reading a latest timestamp that is based on the local time value and a time offset;
   determining a new time offset that would phase-synchronize the latest timestamp with the signal indicative of the reference clock on a boundary defined by a period of the reference clock;
   setting the time offset to the new time offset; and
   applying the time offset to the latest timestamp.

17. The method of claim 16, wherein determining the new time offset comprises:
   determining a delta value to apply to the time offset; and
   determining a smoothed delta value based on the delta value and a weighting factor, wherein setting the time offset is caused by an absolute value of the delta value being less than an absolute value of the smoothed delta value multiplied by a scaling factor.

18. A computing device comprising:
   an interface configured to receive signals from a reference clock;
   a hardware clock signal generator, wherein a local time value is increased by a local time increment on ticks of the hardware clock signal generator;
   an integrated circuit containing a state machine configured to: (i) detect a signal from the reference clock, and (ii) in response to detecting the signal, read the local time value as a current time value;
   one or more processors configured to execute program instructions that cause the computing device to:
      determine a difference between the current time value and a previous time value, wherein the previous time value is based on a previous reading of the local time value;
      based on the difference, determine an adjustment to the local time increment so that the local time value increases at a rate that is closer to that of the reference clock; and
      modify the local time increment by the adjustment.

19. The computing device of claim 18, wherein the difference being greater than a period of the reference clock causes the adjustment to be negative, and wherein the difference being less than the period causes the adjustment to be positive.

20. The computing device of claim 18, wherein the program instructions further cause the computing device to:

read a latest timestamp that is based on the local time value and a time offset;

determine a new time offset that would phase-synchronize the latest timestamp with the signals on a boundary defined by a period of the reference clock;

set the time offset to the new time offset; and apply the time offset to the latest timestamp.

* * * * *